United States Patent
Ohkawa et al.

(10) Patent No.: US 7,053,924 B2
(45) Date of Patent: May 30, 2006

(54) TELEVISION CONFERENCE SYSTEM, TERMINAL FOR THE SYSTEM, CONNECTION CONTROL METHOD, AND CONNECTION CONTROL PROGRAM

(75) Inventors: Tomoki Ohkawa, Tokyo (JP); Naoyuki Uramatsu, Tokyo (JP)

(73) Assignee: Pioneer Corporation, Tokyo (JP)

( * ) Notice: Subject to any disclaimer, the term of this patent is extended or adjusted under 35 U.S.C. 154(b) by 94 days.

(21) Appl. No.: 10/687,646

(22) Filed: Oct. 20, 2003

(65) Prior Publication Data
US 2004/0114030 A1 Jun. 17, 2004

(30) Foreign Application Priority Data
Oct. 22, 2002 (JP) .......................... P2002-306849

(51) Int. Cl.
*H04N 7/14* (2006.01)
(52) U.S. Cl. .................. 348/14.08; 348/14.09; 370/261
(58) Field of Classification Search .. 348/14.01–14.09, 348/14.1, 14.11, 14.12, 14.13; 370/260, 370/261; 709/204
See application file for complete search history.

(56) References Cited

FOREIGN PATENT DOCUMENTS

| JP | 59-230358 A | 12/1984 |
|---|---|---|
| JP | 5-22321 A | 1/1993 |
| JP | 06-261316 | * 9/1994 |

\* cited by examiner

*Primary Examiner*—Melur Ramakrishnaiah
(74) *Attorney, Agent, or Firm*—Sughrue Mion, PLLC

(57) ABSTRACT

Participant terminals which are to be connected to a promoter terminal are configured by speaker terminals which are enabled to perform two-way communication with the promoter terminal, and audience terminals which are enabled to perform one-way communication with the promoter terminal. The connection line number M of participant terminals which are connected to the promoter terminal is set to M=2S+T where S is the number of connected speaker terminals and T is the number of connected audience terminals. As a result, the total amount of communication is suppressed to S×(K−1) (K=S+T) as compared with the conventional art in which all participant terminals are configured by speaker terminals.

8 Claims, 11 Drawing Sheets

FIG. 10

| SELECT PARTICIPANT BASE | | |
|---|---|---|
| JOIN TO SPEECH | JOIN TO AUDIENCE | BASE NAME |
| ∨ | ☐ | BASE B |
| ∨ | ☐ | BASE C |
| ∨ | ☐ | BASE D |
| ☐ | ∨ | BASE E |
| ☐ | ∨ | BASE F |
| ☐ | ☐ | BASE G |
| ☐ | ☐ | BASE H |

[CALL]

[CANCEL]

FIG. 11

LIST OF PARTICIPANT BASE STATUS

- ● BASE A
- ● BASE B
- ● BASE C
- ○ BASE D
- ○ BASE E
- ● BASE F

TELEVISION CONFERENCE SYSTEM, TERMINAL FOR THE SYSTEM, CONNECTION CONTROL METHOD, AND CONNECTION CONTROL PROGRAM

CROSS REFERENCE OF RELATED APPLICATION

This application is based on and claims priority under 35 U.S.C. § 119 with respect to Japanese Patent Application No. 2002-306849 filed on Oct. 22, 2002, the entire content of which is incorporated herein by reference.

BACKGROUND OF THE INVENTION

The present invention relates to a television conference system in which a promoter terminal that is used by a promoter who promotes a conference, and participant terminals that are used by participants in the conference are connected to one another via a communication line, a terminal for a television conference system, a connection control method for a television conference system, and a connection control program for a television conference system.

A multipoint connection television conference system in which a conference is performed among plural terminals that are remotely separated from one another is known. Particularly, a television conference system in which a server apparatus is not disposed (serverless), a public network is used, and data are transmitted and received among plural general-purpose personal computers (PCs) by the circuit switching method has advantages that the system can be easily configured, and that the cost can be reduced, and hence is preferably employed as a small-scale television conference system as disclosed in JP-A-5-22321.

Such a system is configured so as to be serverless. As the number of connected terminals is larger, therefore, the load of data processing to be performed in each terminal is more remarkably increased, so that parallel process cannot be performed by the processing power of a PC. As a result, a restriction that the number of bases which can join a conference, i.e., that of terminals which are connectable to the system cannot be increased without limitation is imposed on such a system.

FIG. 1 shows the configuration of a serverless television conference system. Referring to FIG. 1, five bases A to E are connected to each other in a one-to-one relationship. In the case where the base A serving as a transmission side is to transmit video and audio data produced by a camera 211 and a microphone 212 or conference data produced by a PC to the bases B, C, D, and E, for example, a transmission process must be performed four times. By contrast, in the bases B, C, D, and E serving as a reception side, the video, audio, and conference data must be received from the mutually connected base, and receiving and decoding processes must be performed four times in total. In this way, when a K number of bases are used in a conference, the data transmitting process must be performed (K−1) times, the data receiving process (K−1) times, and the process of decoding received data (K−1) times.

In the television conference system, when the amount of communication from one base to another base is 1, the total amount of communication in a conference is K×(K−1), or increased quadratically with the increase of the number of bases. When the number of bases is increased to a degree at which parallel process of reception, decode, and the like exceeds the throughput of the PC, there arises a problem in that, when all the bases are to be displayed on a monitor device of a terminal, for example, the display is delayed and simultaneity is impaired. Moreover, speech is enabled from all the connected terminals. When speech is made at the same time in plural bases, therefore, speeches are overlappingly output from loudspeakers of the terminals of the bases, thereby causing a problem in that it is difficult to identify the speakers.

SUMMARY OF THE INVENTION

In order to solve the above problems, according to a first aspect of the present invention, there is provided a television conference system including: a promoter terminal that is used by a promoter who promotes a conference; and a plurality of participant terminals that are used by participants in the conference and connected to the promoter terminal via a communication line, wherein a maximum connection line number N of the participant terminals which are connectable to the promoter terminal is previously set, and a connection line number M of participant terminals which are connected to the promoter terminal is set to $M \leq N$.

In addition, according to a second aspect of the present invention, there is provided A terminal for a television conference system in which a promoter terminal that is used by a promoter who promotes a conference, and participant terminals that are used by participants in the conference are connected to one another via a communication line, the terminal including a television conference control unit including a terminal function selection unit for selecting the terminal to function as either of a promoter terminal of a conference or a participant terminal in accordance with selection, wherein a maximum connection line number of the participant terminals which are connectable to the promoter terminal is previously set to the television conference control unit.

In addition, according to a third aspect of the present invention, there is provided a connection control method for a television conference system in which a promoter terminal that is used by a promoter who promotes a conference, and participant terminals that are used by participants in the conference are connected to one another via a communication line, the method including: setting a maximum connection line number N of the participant terminals which are to be connected to the promoter terminal; and connecting the participant terminals to the promoter terminal while setting a connection line number M of the connected participant terminals to $M \leq N$.

In addition, according to a fourth aspect of the present invention, there is provided a connection control program that permits a computer to perform a process for a television conference system in which a promoter terminal that is used by a promoter who promotes a conference, and participant terminals that are used by participants in the conference are connected to one another via a communication line, the program including: setting a maximum connection line number N of the participant terminals which are to be connected to the promoter terminal; and connecting the participant terminals to the promoter terminal while setting a connection line number M of the connected participant terminals to $M \leq N$.

BRIEF DESCRIPTION OF THE DRAWINGS

These and other objects and advantages of this invention will become more fully apparent from the following detailed description taken with the accompanying drawings in which:

FIG. 10 is a view showing an example of a display of a dialog box for selecting participant bases;

FIG. 11 is a view showing an example of a display of a participation mode list which is displayed when a changeover between a speaker terminal and an audience terminal is to be performed.

DETAILED DESCRIPTION OF THE PREFERRED EMBODIMENTS

Hereinafter, an embodiment of the invention will be described with reference to the accompanying drawings.

Figure 1:
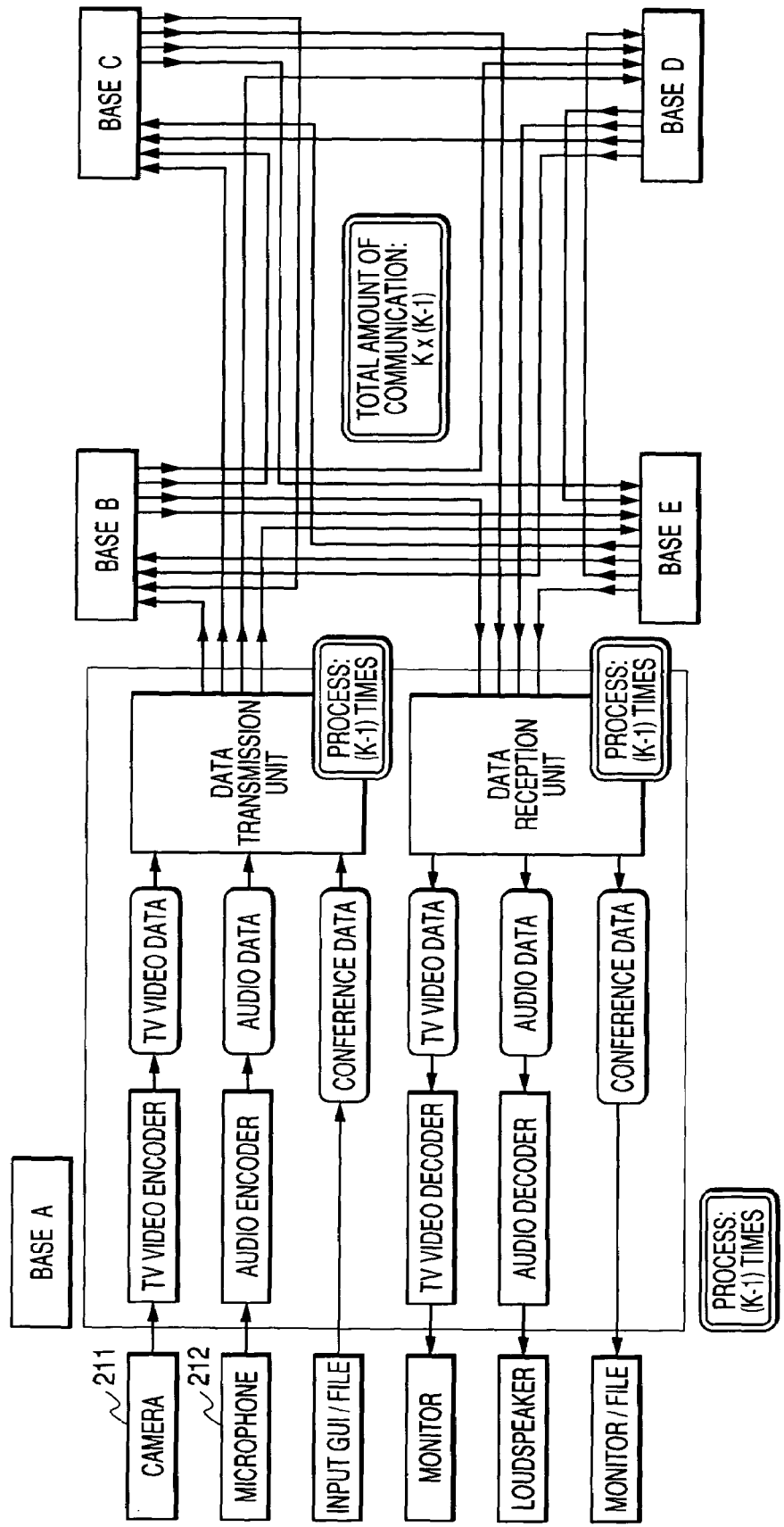
FIG. 1 is a diagram showing the configuration of a serverless television conference system.
Figure 2:
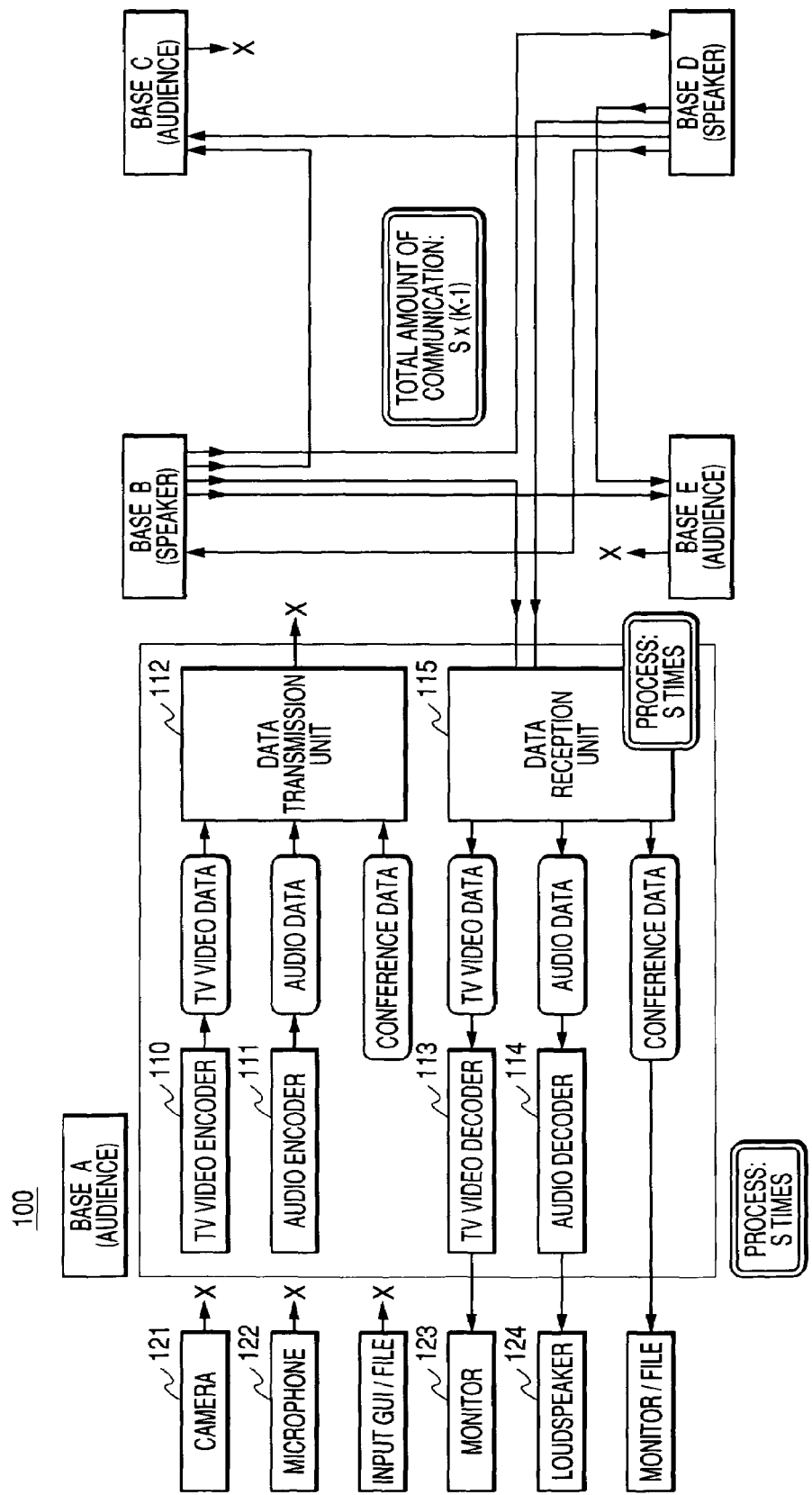
FIG. 2 is a diagram showing the configuration of a television conference system which is an embodiment of the invention.

FIG. 2 shows the configuration of a television conference system which is an embodiment of the invention. In the television conference system of the embodiment of the invention, plural terminals for a television conference system are connected to each other in a one-to-one relationship via a public telephone network, and data are transmitted and received by the circuit switching method. In a terminal 100 of FIG. 2, the configuration for data process is mainly shown. The terminal includes a communication control section having: a television video encoder 110; an audio encoder 111; a data transmission unit 112; a television video decoder 113; an audio decoder 114; and a data reception unit 115. Input/output operations with respect to the outside are performed through a camera 121, a microphone 122, a monitor device 123, and a loudspeaker 124. In the terminal 100, data flows in an audience terminal described later are indicated by the arrows, data input to the terminal 100 is limited, and only data to be output from the terminal 100 is processed.

The terminal for a television conference system of the invention includes a so-called television conference function, and can handle business applications such as a spreadsheet software a word process software and a presentation software. A display device of the terminal performs a function of a whiteboard. Data of the applications and those written on the whiteboard may be shared by the plural terminals, so that a conference can be performed in the state where the same contents are displayed on all the terminals. Images (the promoter and participants) of the bases are displayed on the display devices of the terminals for a television conference system.

Figure 3:
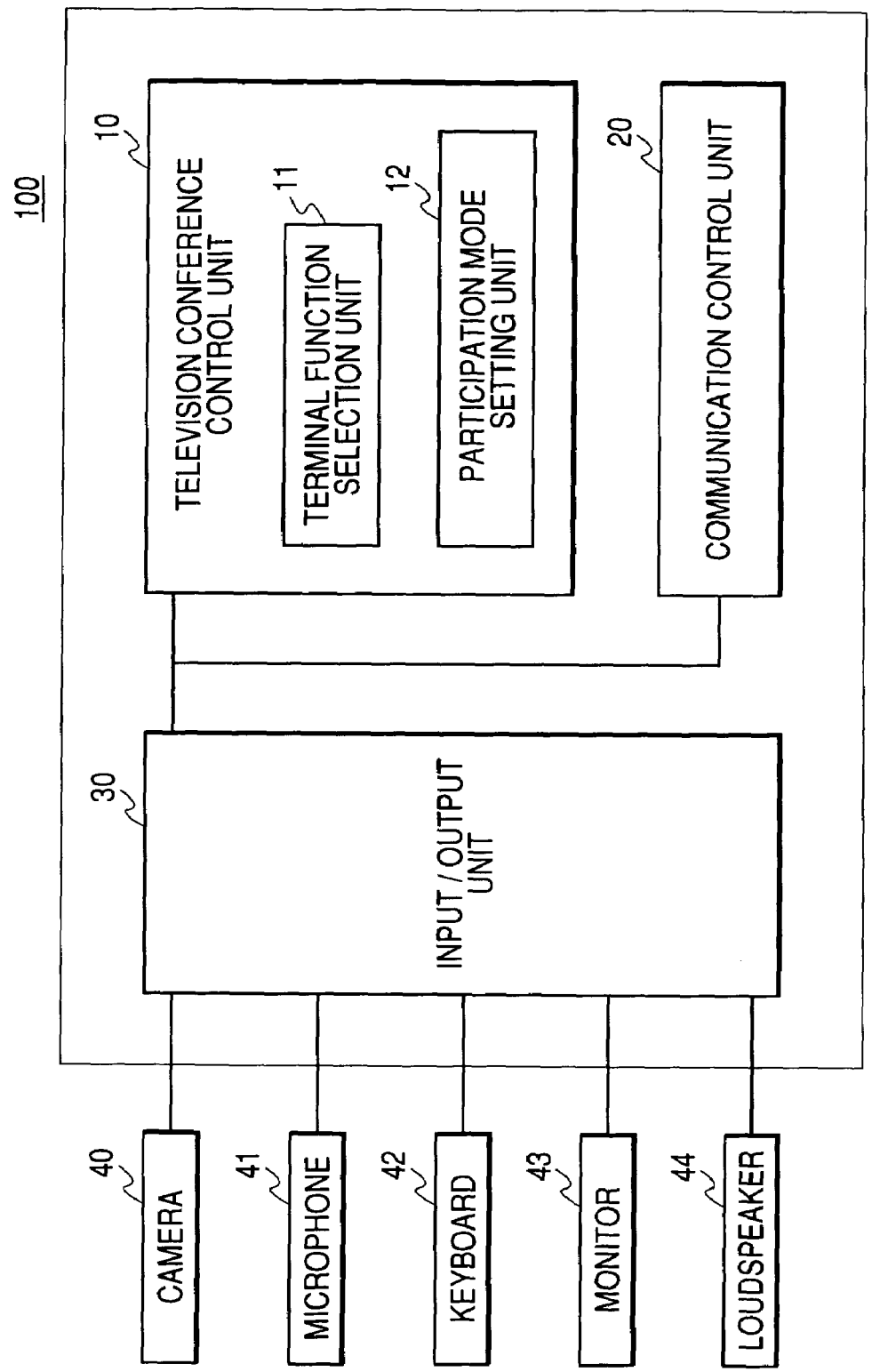
FIG. 3 is a diagram showing the functional configuration of the television conference system terminal of the embodiment of the invention.

FIG. 3 is a diagram showing the configuration of the television conference system terminal of the embodiment of the invention, and shows mainly a control function. The terminal 100 for a television conference system is configured by a general-purpose personal computer (PC), and includes a television conference control unit 10, a communication control unit 20, and an input/output unit 30.

The television conference control unit 10 controls the whole conference including the establishment and progress of a conference. The television conference control unit includes: a terminal function selection unit 11 which selects the television conference system terminal to function as either of a promoter terminal of a conference or a participant terminal; and a participation mode setting unit 12 which sets the participant terminal to either of a speaker terminal or an audience terminal, and which switches over a speaker terminal function and an audience terminal function. The television conference control unit is stored in the form of a program in a memory (not shown) of the television conference system terminal 100, and realized by implementing the program by a CPU (not shown) of the television conference system terminal 100.

The communication control unit 20 is configured by a transmission unit and a reception unit which control data communication in a conference, and includes the video encoder/decoder which encodes/decodes video data, and the audio encoder/decoder which encodes/decodes audio data. The input/output unit 30 is a unit serving as an interface with the television conference control unit and the communication control unit, and connected with a camera 40, a microphone 41, and a keyboard 42 which are used for inputting data, a monitor device 43 and a loudspeaker 44 which are used for outputting data, and the like.

Next, the function of the television conference control unit will be described. The same television conference system terminal can be used as either of modes, i.e., as a promoter terminal or as a participant terminal, and, when the terminal is activated, set to function as either of the terminals. At any timing during a conference, the terminal mode can be switched over in response to a switch request. The mode selection is performed by the operator through the keyboard or a mouse in accordance with a GUI (Graphical User Interface) which is displayed on the monitor device by the terminal function selection unit 11. When the terminal is selected as a promoter terminal, the terminal can implement various functions of the conference promoter, such as: selection of a conference participant base through the terminal; designation of a speaker terminal or an audience terminal; change of a voice which will be described later, and setting of the priority of the voice; and storage and distribution of conference data. By contrast, when the terminal is selected as a participant terminal, the terminal implements only limited functions such as transmission and reception of conference data including video and audio data.

In the television conference system terminal, a maximum connection line number N is previously set in the television conference control unit, and connection of terminals of a number requiring lines of a number which is larger than N is limited. Preferably, the maximum connection line number N is automatically set in accordance with the throughput of the PC, and setting of the resolution (size) of an image to be displayed on the monitor device. The number may be manually set within a predetermined range through an input unit such as the keyboard of the terminal.

At activation or any timing during a conference, the use of the television conference system terminal as a speaker terminal or as an audience terminal can be designated through a promoter terminal. The designation is performed by the operator through the keyboard or the mouse in accordance with the GUI which is displayed on the monitor device by the participation mode setting unit 12. When the terminal is designated as a speaker terminal, the terminal performs encoding and transmitting processes on television video data and audio data supplied from the camera and the microphone which are connected to the terminal, and also receiving and decoding processes on video data and audio data received from another terminal connected to the terminal (two-way communication: full-duplex communication). By contrast, when the terminal is designated as an audience terminal, encoding and transmitting processes on television video data and audio data supplied from the camera and the microphone which are connected to the terminal are not performed as indicated by the marks x in FIG. 2, and the terminal performs only receiving and decoding processes on video data and audio data received from another terminal connected to the terminal (one-way communication: half-duplex communication). The connection with an audience terminal is realized by half-duplex communication in order to transmit a voice request to the promoter terminal.

In the case where, in response to a request from, for example, an audience terminal during a conference, the promoter terminal changes the audience terminal to a speaker terminal, or the case where a current speaker terminal is selected and then changed to an audience terminal in order to change an audience terminal issuing such a request to a speaker terminal, the participation mode of the terminal can be switched over. The operation of the switching is performed by the operator through the keyboard, the mouse, or the like in accordance with a GUI which is displayed on the monitor device by the participation mode setting unit 12.

Next, allocation and setting of a speaker terminal and an audience terminal will be described. As described above, in the television conference system terminal, the maximum connection line number N is previously set, and the connection line number M of connected participant terminals is set to M≦N. When speaker and participant terminals are to be set through the promoter terminal, the number S of the speaker terminals and the number T of audience terminals are allocated so that the total line number M of the connected participant terminals is set to M=2S+T. For the sake of simplicity of calculation, it is assumed that the line number M of the participant terminals is 10 units. When speaker terminals are set in four bases, audience terminals are calculated to be in two bases, and, when speaker terminals are set in three bases, audience terminals are calculated to be in four bases.

In this way, participant terminals are classified into speaker terminals which perform two-way communication, and audience terminals which perform one-way communication, whereby the amount of communication in a conference can be suppressed and hence the number of participant bases can be increased. The case where M=10 in the same manner as described above will be described. Conventionally, all of connected terminals perform full-duplex communication. Therefore, M=2K, and hence K=5 or the maximum number of bases is 5. By contrast, in the television conference system of the embodiment of the invention, the connection line number is set to M=2S+T. When speaker terminals are limited to three bases (i.e., S=3), for example, T=4, and audience terminals can be disposed in four bases at the maximum. Therefore, the base number K (=S+T) can be increased to 7 as compared with 5 in the conventional art.

The reduction of the total amount of communication which is caused by classifying the participant terminal into speaker terminals and audience terminals will be described with reference to FIG. 2. In FIG. 2, the bases B, D are set as speaker terminals, and the bases A, C, E are set as audience terminals. The arrows in the figure indicate data flows and processes in the case where a conference is performed among the five bases. As shown in FIG. 2, the audience terminals do not transmit information (video and audio data), and hence data transmission from the data transmission unit 112 is inhibited as indicated by the marks x in the figure. In the audience terminals A, C, E, only processes of receiving and decoding information from the speaker terminals are performed, and hence the information amount to be processed by the PC is reduced.

The speaker terminals transmit video and audio data to the other terminals. When the amount of communication from one base to another base is indicated by 1, the total amount of communication in a conference in the television conference system of the embodiment of the invention is S×(K−1). From K=S+T, S<K is held. Therefore, the amount of communication can be largely reduced as compared with the total amount of communication K×(K−1) in the conventional art, particularly in the case where the number S of speaker terminals is limited to a small value.

In the settings of the number of speaker terminals and audience terminals, when bases are to be set so that the total number of used lines of the speaker terminals and the audience terminals exceeds the maximum connection line number N, a warning message is preferably displayed on the screen of the monitor device, thereby disabling such setting.

Although FIG. 2 shows the example in which the system is configured by five terminals, it is a matter of course that a larger number of terminals may be connected as far as required processes do not exceed the parallel process capabilities of the PCs, i.e., the connectable line number N.

Next, the operation of the television conference system of the embodiment of the invention will be described with reference to the flowcharts of FIGS. 4 to 9. First, the terminal function selecting process in the television conference system of the embodiment at the beginning of a conference will be described.

Figure 4:
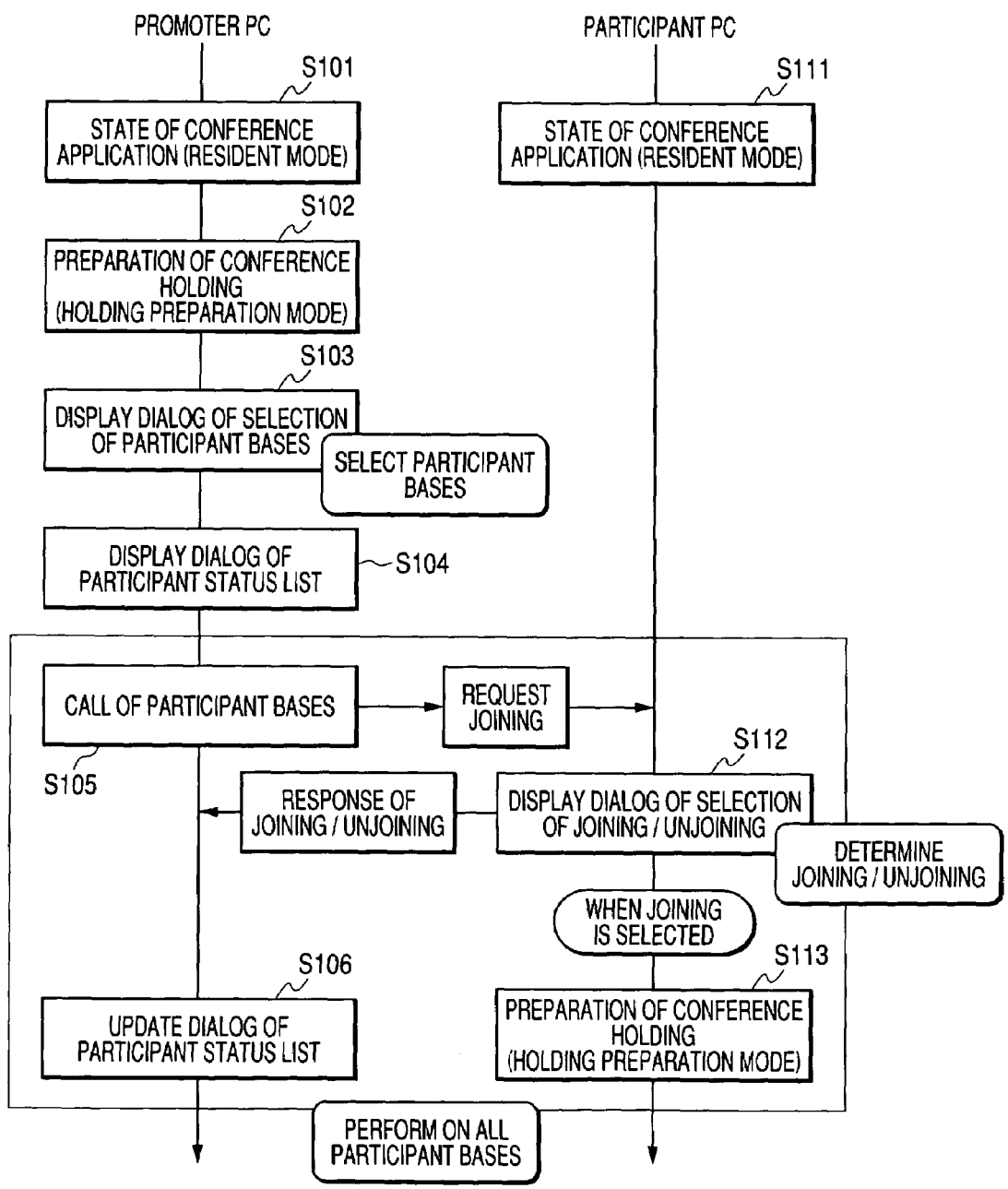
FIG. 4 is a flowchart showing a case where a promoter terminal sends a call for holding a conference to participant terminals which are connected to the promoter terminal.

FIG. 4 is a flowchart showing a case where the promoter terminal sends a call for holding a conference to the participant terminals connected to the promoter terminal. For the sake of convenience in description, only one of plural participant terminals which communicate with the promoter terminal is shown in FIG. 4.

First, a control program (application program) for a television conference system is activated in the promoter terminal and the participant terminal (steps S101 and S111). Next, the operator operates the screen of the promoter terminal to set a conference holding preparation mode (step S102), and a dialog for selecting bases which are to be joined to the conference is displayed on the screen of the monitor device (step S103). FIG. 10 shows an example of a display of a dialog box for selecting participant bases. As shown in FIG. 10, when a conference is to be held, the operator of the promoter terminal can select bases (terminals) which are to be joined to the conference, and previously designate the participation mode of each terminal in which the terminal is set to either of a speaker terminal or an audience terminal.

In the selection of participant terminals, the number of selected participant terminals is limited so as not to exceed the preset maximum connection line number.

When participant terminals are selected and their participation modes are designated, the selection status is displayed in the form of a list in which, for example, corresponding check boxes are checked (step S104). When a call button in the dialog box is pressed, the selected bases are called (step S105).

In each of the participant terminals which are called, a dialog for inquiring whether the terminal is to join the conference or not is displayed on the screen (step S112). The operator of each of the participant terminals determines joining/unjoining to the conference, and a response of joining/unjoining is transmitted to the promoter terminal. If joining is selected, the terminal is set to the conference holding preparation mode in which the terminal is enabled to perform data communication with the promoter terminal (step S113). On the other hand, in the promoter terminal which receives the response of joining/unjoining to a conference from the participant terminal, the response result is updated and displayed in a dialog box similar to that of FIG. 10 (step S106). Similar procedure is performed on all bases connected to the promoter terminal.

As a result, the procedure of calling participant terminals is ended, and all the terminals of the bases which select joining to the conference are set to the conference holding preparation mode in which transmission and reception with the promoter terminal are enabled.

Next, the flow of a process of setting the participation mode at the beginning of the conference in the television conference system of the embodiment of the invention will be described.

Figure 5:
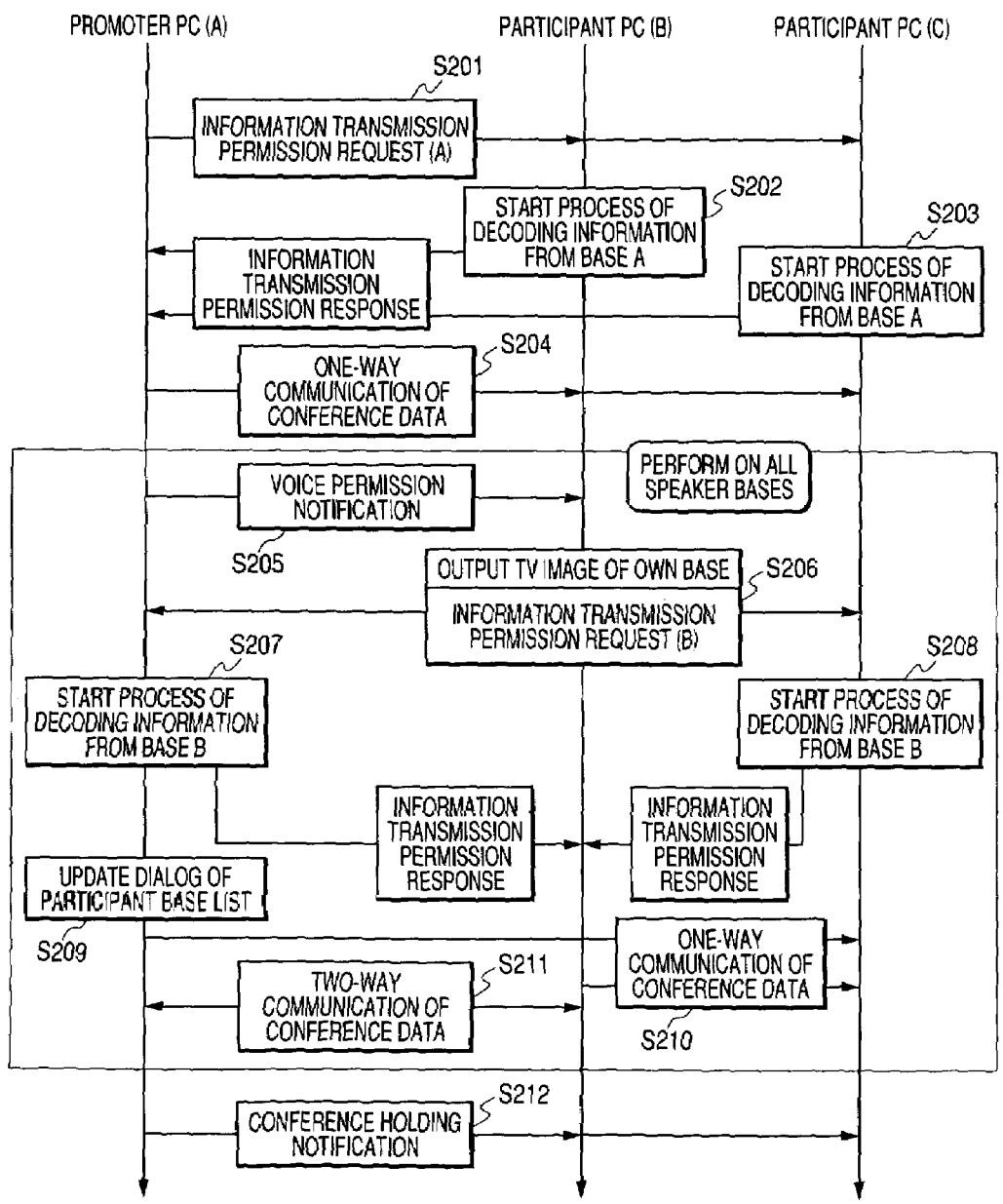
FIG. 5 is a flowchart showing a case where the promoter terminal sets the terminals of bases which select joining to the conference, to either of a speaker terminal or an audience terminal.

FIG. 5 is a flowchart showing a case where the promoter terminal sets the terminals of the bases which select joining to the conference, to either of a speaker terminal or an audience terminal. For the sake of convenience in description, among the bases which join the conference, one terminal (participant terminal B) which is to be set to a speaker terminal, and one terminal (participant terminal C) which is to be set to an audience terminal are shown in FIG. 5, in addition to the promoter terminal (terminal A).

First, an information transmission permission request for transmitting video and audio data of the promoter terminal is transmitted from the promoter terminal A to the participant terminals of the conference holding preparation mode (step S201). In response to the information transmission permission request, The participant terminals B and C start the process of decoding the video and audio data transmitted from the promoter terminal (steps S202 and S203), and at the same time return an information transmission permission response to the promoter terminal A. When the decoding process is started, the monitor of each participant terminal acquires images and voices of conference participants in the promoter terminal.

On the other hand, so-called conference data such as data of various applications activated on the promoter terminal, and data which are input in the case where the whiteboard function of the monitor device of the promoter terminal is used are transmitted by means of one-way communication from the promoter terminal A to the participant terminals B and C (step S204). When this procedure is ended, all the participant terminals are provided with a function of an audience terminal.

Thereafter, the terminals which are designated in step S103 of FIG. 4 as speaker terminals by the promoter terminal are provided with a function of a speaker terminal.

The promoter terminal A transmits a voice permission notification to the terminals which are designated as speaker terminals at the beginning of the conference (step S205). In this case, the participant terminal B which is designated as a speaker terminal and receives the voice permission notification transmits to the other terminals an information transmission request for transmitting video and audio data obtained by the camera and the microphone connected to the terminal itself (i.e., the image and voice of a conference participant of the participant terminal B), to the other terminals (step S206).

The promoter terminal A and the participant terminal C receive the information transmission permission request transmitted from the terminal B, and start a process of decoding the video and audio data transmitted from the participant terminal B functioning as a speaker terminal (steps S207 and S208), and return the information transmission permission response to the speaker terminal B. In the promoter terminal A, a dialog of a participant base list is updated and displayed (step S209), one-way communications of information from the promoter terminal A to the audience terminal C, and from the speaker terminal B to the audience terminal C are started (step S210), and the monitor devices of the terminals of the promoter terminal A and the audience terminal C obtain the image and voice of the conference participant of the speaker terminal B. By contrast, two-way communication of information between the promoter terminal A and the speaker terminal B is started (step S211). After the process of starting the communications, the promoter terminal A transmits a conference holding notification to the terminals B and C (step S212). The same procedure is performed on all the bases connected to the promoter terminal.

As a result, the procedure of setting all the participant terminals to an audience terminal or a speaker terminal is ended, the audience terminals are set to a state where information can be received from another terminal, and the speaker terminals to a state where information can be received from another terminal and information can be transmitted to another terminal.

In the above, the setting procedure at the beginning of a conference has been described. In the television conference system of the embodiment of the invention, as described above, speaker terminals which perform two-way communication during a conference, and audience terminals which perform one-way communication can be freely switched over. When this switching operation is performed, a speech is enabled at any base. Moreover, the number of speaker terminals which perform two-way communication is limited, and terminals in which speech is disabled are caused to perform one-way communication, whereby a conference in which a larger number of bases are connected by using limited communication lines (communication capacity) can be realized.

Next, the flow of a process of changing the participation mode during a conference in the television conference system of the embodiment will be described.

Figure 6:
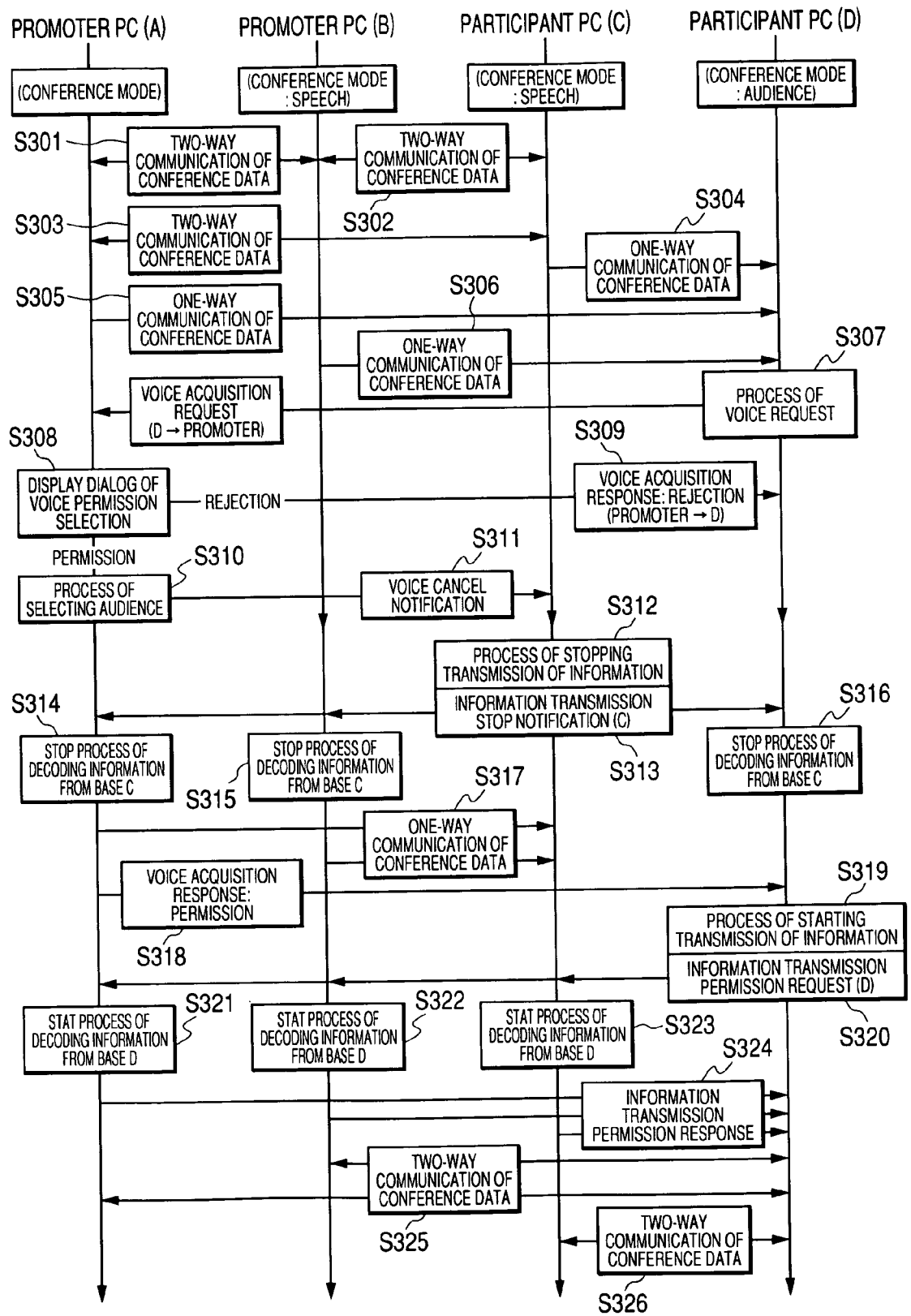
FIG. 6 is a flowchart showing a case where, in response to a voice request from an audience terminal, the promoter terminal selects one of speaker terminals which is to be changed to an audience terminal, and the audience terminal is changed to a speaker terminal.

FIG. 6 is a flowchart showing a case where, in response to a voice request from an audience terminal, the promoter terminal selects one of speaker terminals which is to be changed to an audience terminal, and the audience terminal is changed to a speaker terminal. For the sake of convenience in description, among the bases which join the conference, two speaker terminals (participant terminals B and C), and one audience terminal (participant terminal D) are shown in FIG. 6, in addition to the promoter terminal (terminal A).

First, two-way communication of conference data including images and voices is performed between the promoter terminal A in which the procedure of holding the conference is ended and the conference mode is set, and the speaker terminal B, between the speaker terminals B and C, and between the speaker terminal C and the promoter terminal A (steps S301, S302, and S303). On the other hand, one-way communication of conference data including images and voices is performed from the speaker terminal C to the audience terminal D, from the promoter terminal A to the audience terminal D, and from the speaker terminal B to the audience terminal D (steps S304, S305, and S306).

When the operator of the audience terminal D wishes to make a speech, the operator presses a voice request button on the screen of the monitor device, and the audience terminal D then sends a voice request to the promoter terminal A (step S307). The promoter terminal A receives the voice request and then displays a dialog indicative of the reception of a voice request (step S308). In the case where the request is to be rejected, the operator presses a rejection button, a rejection response is then transmitted (step S309), and a dialog indicative of the rejection of the voice request is displayed on the screen of the audience terminal D.

By contrast, in the case where the voice request of the participant D is to be allowed, when the maximum number of connectable lines are already used, one of the speaker terminals must be changed to an audience terminal. The operator of the promoter terminal selects one speaker terminal from a participation mode list of participant terminals such as shown in FIG. 11 which is displayed on the monitor, and changes the selected terminal to an audience terminal.

When the speaker terminal C is selected to be changed to an audience terminal (step S310), for example, a voice cancel notification is transmitted to the speaker terminal C (step S311). Upon reception of the voice cancel notification, the terminal C performs a process of stopping transmission of information such as video and audio data (step S312), and transmits an information transmission stop notification to all the terminals (step S313). The terminals which receive the information transmission stop notification stop the process of decoding information transmitted from the terminal C (steps S314, S315, and S316). Thereafter, the promoter terminal A and the speaker terminal B perform one-way communication to the terminal C (step S317), and the terminal C is set as an audience terminal.

Then, a voice acquisition response is transmitted from the promoter terminal A to the terminal D (step S318). The terminal D which receives the response performs a process of starting information transmission (step S319), and the terminal D transmits the information transmission permission request to the terminals (step S320). Upon reception of the permission request, the terminals start the process of decoding information transmitted from the terminal D (steps S321, S322, and S323). The terminal D receives an information transmission permission response from the terminals and then serves as a speaker terminal (step S324), and starts two-way communication of conference data with the promoter terminal A, the speaker terminal B, and the audience terminal C (steps S325 and S326).

As a result, the procedure of changing the speaker terminal C to an audience terminal, and the audience terminal D to a speaker terminal is ended. The change from a speaker terminal to an audience terminal may be performed by manually selecting a speaker terminal by the operator of the promoter terminal when a voice request is issued. Alternatively, a priority list of speaker terminals which can be changed to an audience terminal may be previously held in the participation mode setting unit 12, and, when a voice request is issued, the switching from a speaker terminal to an audience terminal may be automatically performed in accordance with the priority list. The priority list may be manually produced by the operator of the promoter terminal at, for example, an activation of the system. Alternatively, the priority list may be automatically organized on the basis of speech history in a conference, and the like. For example, a method is preferably employed in which a speaker terminal from which speeches in a conference have been made in a small number is assumed that speeches from the terminal will be seldom made, and the priority of the change to an audience terminal is raised.

Next, the flow of a process of changing a speaker during a conference in the television conference system of the embodiment of the invention will be described.

Figure 7:
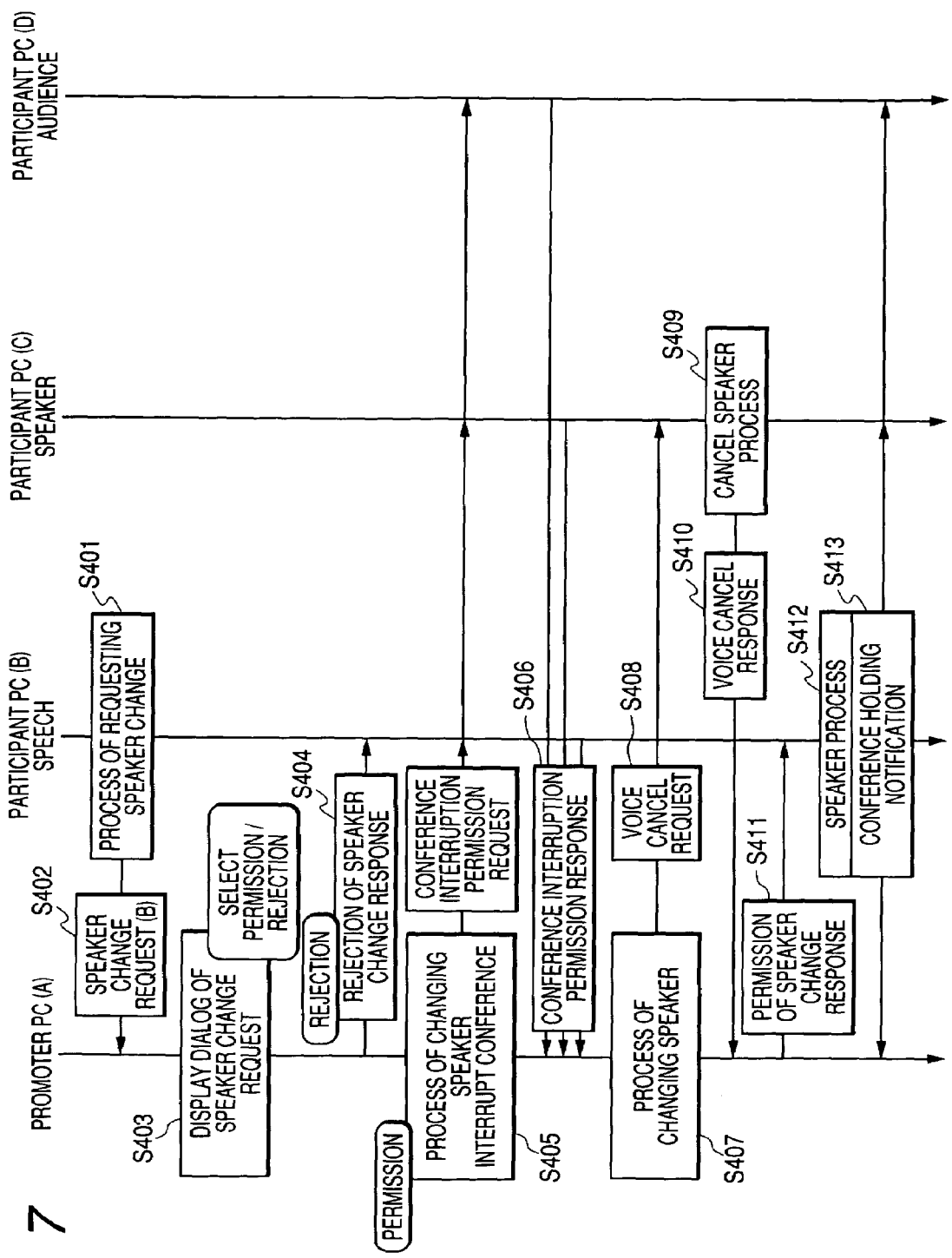
FIG. 7 is a flowchart showing a case where the speaker is changed from the operator of a speaker terminal through which a speech is currently made, to the operator of another speaker terminal.

Even the operator of a speaker terminal can make a speech through only one base. In a conference, therefore, the speaker must be adequately changed over in accordance with the progress of the conference. FIG. 7 is a flowchart showing a case where the speaker is changed from the operator of a speaker terminal through which a speech is currently made, to the operator of another speaker terminal. For the sake of convenience in description, among the bases which join the conference, two speaker terminals (participant terminals B and C), and one audience terminal (participant terminal D) are shown in FIG. 7, in addition to the promoter terminal (terminal A).

First, the operator of the speaker terminal B presses a speech request button on the screen to transmit a speaker change request to the promoter terminal (step S401). On the screen of the promoter terminal which receives the change request (step S402), a dialog indicating that the terminal B requests a speech is displayed (step S403). The operator of the promoter terminal A selects permission or rejection of the speaker change. If the speaker change is rejected, a rejection notification is transmitted to the terminal B (step S404). By contrast, if the speaker change is permitted, a conference interruption permission request is transmitted to the terminals to temporarily interrupt the conference for the sake of the speaker change (step S405).

When the promoter terminal A receives a response to the conference interruption permission request from the terminals (step S406), the promoter terminal A starts a speaker changing process (step S407), and transmits a voice cancel request to the speaker terminal C which currently makes a speech (step S408). The terminal C which receives the voice cancel request cancels the speaker process (step S409), and then transmits a response to the cancel request (step S410). The promoter terminal A which receives the response to the voice cancel request from the terminal C transmits a response to the speaker change request to the terminal B which requests the voice (step S411). The speaker terminal B which receives the response starts the speaker process (step S412), and transmits a notification of resuming the conference which has been interrupted, to the terminals (step S413).

As a result, the process of changing the speaker from the speaker terminal C to the speaker terminal B is ended. The speaker change may be permitted or rejected by a manual operation of the operator of the promoter terminal when the request is issued. Alternatively, the request may be transmitted to the current speaker, and the current speaker may determine permission or rejection of the speaker change. The promoter terminal may automatically determine permission or rejection of the speaker change on the basis of the speech history of the current speaker. For example, a method may be preferably employed in which, with respect to a speaker whose accumulated speech time exceeds a given time at the timing when a speaker change request is issued, the voice is compulsively transferred to a speaker terminal which has issued the change request.

Next, a flow of a process of ending a speech in the television conference system of the embodiment of the invention will be described.

Figure 8:
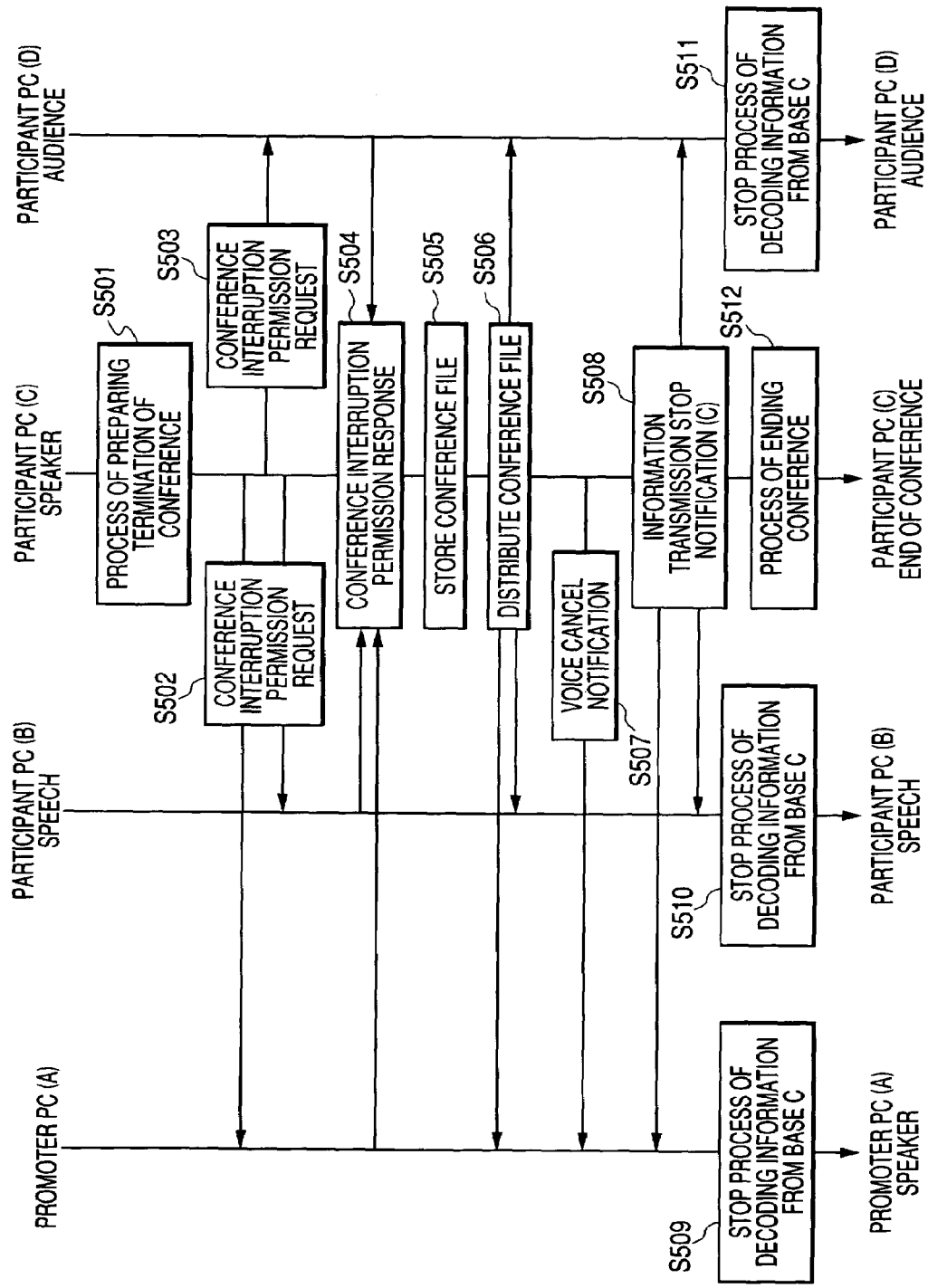
FIG. 8 is a flowchart showing a case where a speaker terminal which is currently serving as a speaker terminates a speech.

FIG. 8 is a flowchart showing a case where a speaker terminal which is currently serving as a speaker terminates a speech. For the sake of convenience in description, among the bases which join the conference, two speaker terminals (participant terminals B and C), and one audience terminal (participant terminal D) are shown in FIG. 8, in addition to the promoter terminal (terminal A).

First, the speaker terminal C in which a speech is ended starts a process of preparing termination of the conference (step S501), and transmits a conference interruption permission request to all the terminals (steps S502 and S503). When the speaker terminal C receives a response to the conference interruption permission request from the terminals (step S504), the speaker terminal C stores a conference file which was produced on the terminal C during the speech (step S505), the stored file is distributed to terminals that are arbitrarily selected (step S506).

When the distribution of the conference file to the terminals is ended, the terminal C transmits a voice cancel notification to the promoter terminal A (step S507), and at the same time transmits an information transmission stop notification to the terminals (step S508). The terminals which receive the information transmission stop notification stop the process of decoding information transmitted from the terminal C (steps S509, S510, and S511).

In the figure, an example in which the speaker terminal C in which a speech has been ended performs a conference ending process (step S512), and which leaves the conference.

As a result, the speech ending process by the speaker terminal C is ended. The conference end preparing process in step S501 is started not only in the case where the speech through the terminal C is ended, but also in the case where, for example, a speaker change request is issued from another speaker terminal and the changed is permitted.

Next, a flow of a process of ending the conference in the television conference system of the embodiment of the invention will be described.

Figure 9:
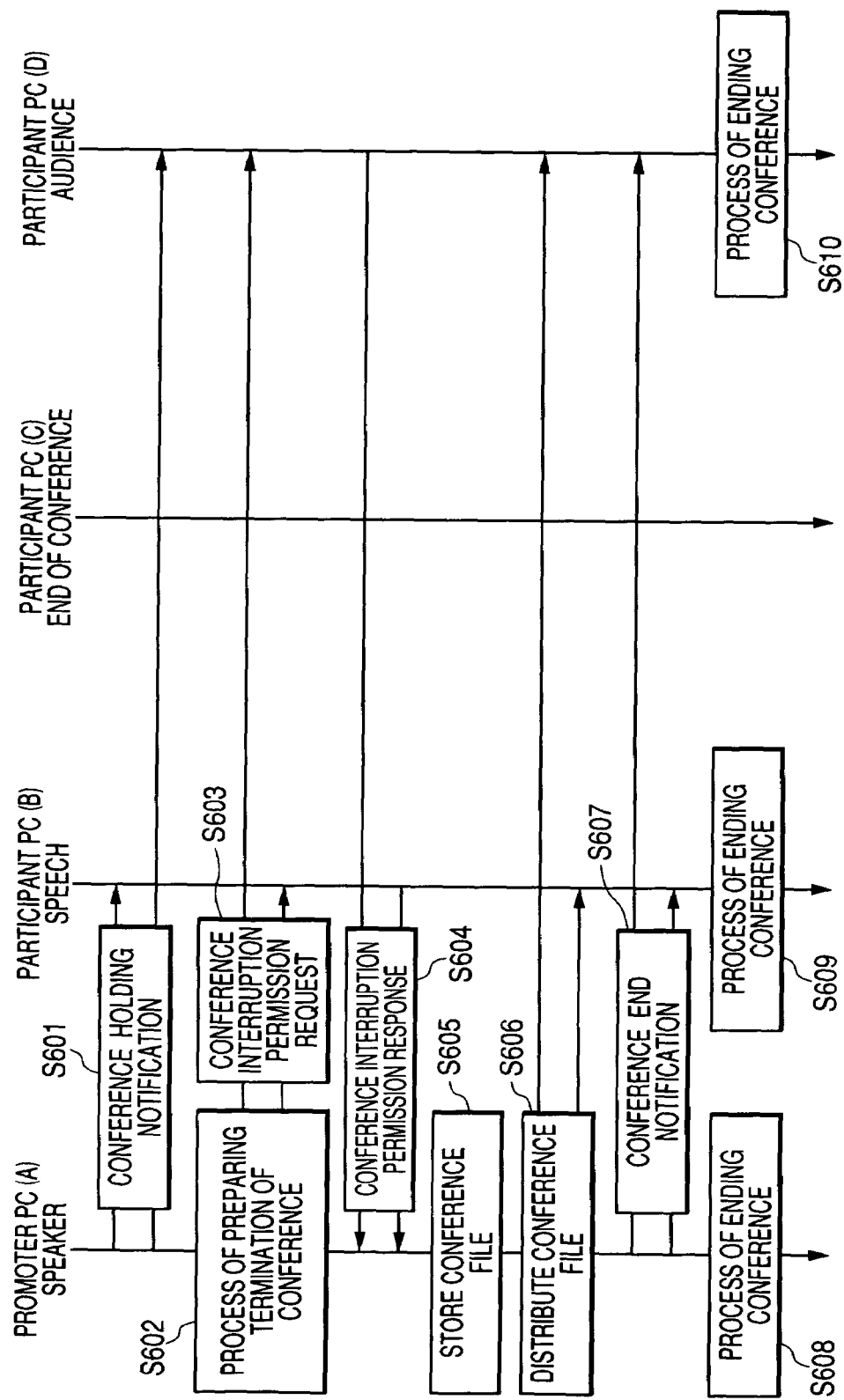
FIG. 9 is a flowchart showing a case where all the terminals simultaneously end a conference.

FIG. 9 is a flowchart showing a case where all the terminals simultaneously end the conference. For the sake of convenience in description, among the bases which join the conference, one speaker terminal (participant terminal B, the participant terminal C has already performed the conference ending process and left the conference), and one audience terminal (participant terminal D) are shown in FIG. 9, in addition to the promoter terminal (terminal A).

First, in order to resume the conference which has been temporarily interrupted by the speech ending process by the participant terminal C, the promoter terminal A transmits a conference resume notification to the terminals B and D (step S601). Next, the promoter terminal A starts the conference end preparing process (step S602), and sends a conference interruption permission request to the terminals B and D (step S603). The promoter terminal A which receives a response to the conference interruption permission request from the terminals B and D (step S604) stores a conference file in which the past conference history is recorded (step S605), and distributes the stored file to a selected one of the terminals B and D (step S606). Finally, a conference end notification is transmitted from the promoter terminal A to the terminals B and D (step S607), and all of the promoter terminal A and the terminals B and D perform the conference ending process (steps S608, S609, and S610), and the conference is then ended.

As a result, the conference ending process is ended. Even after the conference is then ended, when a call for holding a conference is again produced, the system can reply to the call as far as the control program (application program) for a television conference system is activated in the terminals.

In the above-described television conference system of the embodiment, the maximum connection line number N of participant terminals which are connectable to the promoter terminal is previously set, and the connection line number M of participant terminals which are connected to the promoter terminal is set to M≦N. The terminal for a television conference system includes the function (the television conference control unit 10 of FIG. 3) of previously setting the maximum connection line number of participant terminals which are connectable to the promoter terminal. In the connection control method for a television conference system, the maximum connection line number N of participant terminals which are to be connected to the promoter terminal is previously set, and the participant terminals are connected to the promoter terminal while setting the connection line number M of the connected participant terminals to M≦N (S103 of FIG. 4). The connection control program for a television conference system causes a computer to realize functions of previously setting the maximum connection line number N of the participant terminals which are to be connected to the promoter terminal, and connecting the participant terminals to the promoter terminal while setting the connection line number M of the connected participant terminals to M≦N.

According to the embodiment, the maximum connection line number M of the participant terminals which are to be connected to the promoter terminal can be suppressed to the preset maximum connection line number or smaller, and hence terminals are prevented from being added without limitation to exceed the throughput of a PC.

What is claimed is:

1. A television conference system, comprising:
   a promoter terminal that is used by a promoter who promotes a conference; and
   a plurality of participant terminals that are used by participants in the conference and connected to the promoter terminal via a communication line, wherein
   a maximum connection line number N of the participant terminals which are connectable to the promoter terminal is previously set, and a connection line number M of participant terminals which are connected to the promoter terminal is set to M≦N wherein
   the participant terminals includes speaker terminals which are enabled to perform two-way communication with the promoter terminal, and audience terminals which are enabled to perform one-way communication with the promoter terminal, and the connection line number M of participant terminals which are connected to the promoter terminal is set to M=2S+T where S is a number of connected speaker terminals and T is a number of connected audience terminals, and
   in response to a voice request from one of the audience terminals, the promoter terminal selects one of the speaker terminals which is transferable to an audience terminal, transfers the selected speaker terminal to an audience terminal, while transfers the audience terminal issuing the voice request to a speaker terminal.

2. A television conference system according to claim 1, wherein
the promoter terminal previously sets a speaker terminal which is transferable to an audience terminal, and, in response to the voice request, selects the preset speaker terminal to transfer the selected speaker terminal to an audience terminal.

3. A television conference system according to claim 1, wherein
the promoter terminal previously sets plural speaker terminals which are transferable to an audience terminal, while allocating priorities to the speaker terminals, and, in response to the voice request, transfers one of the speaker terminals which is selected in accordance with the priorities.

4. The television conference system as claimed in claim 1, wherein the maximum connection line number N is less than a total number of potential connection lines between the promoter terminal and the participant terminals.

5. A terminal for a television conference system in which a promoter terminal that is used by a promoter who promotes a conference, and participant terminals that are used by participants in the conference are connected to one another via a communication line, the terminal comprising
a television conference control unit including
a terminal function selection unit for selecting the terminal to function as either of a promoter terminal of a conference or a participant terminal in accordance with selection, wherein
a maximum connection line number of the participant terminals which are connectable to the promoter terminal is previously set to the television conference control unit,
in accordance with selection, each of the participant terminals functions as a speaker terminal which is enabled to perform two-way communication with the promoter terminal, or as an audience terminal which is enabled to perform one-way communication with the promoter terminal, and
a terminal functioning as the promoter terminal comprises a section for, in response to a voice request from one of the audience terminals, selecting one of the speaker terminals which is transferable to an audience terminal, transferring the selected speaker terminal to an audience terminal, while transferring the audience terminal issuing the voice request to a speaker terminal.

6. A terminal for a television conference system according to claim 5, wherein
the transferring is performed while forming relationships that a connection line number M of participant terminals which are connected to the promoter terminal is set to $M \leqq N$ and that the connection line number M of participant terminals which are connected to the promoter terminal is set to $M=2S+T$ where S is a number of connected speaker terminals and T is a number of connected audience terminals.

7. A terminal for a television conference system according to claim 5, wherein
the speaker terminal is selected in accordance with preset priorities.

8. The terminal as claimed in claim 5, wherein the maximum connection line number is less than a total number of potential connection lines between the promoter terminal and the participant terminals.

* * * * *